(12) United States Patent
Yang et al.

(10) Patent No.: US 10,817,716 B2
(45) Date of Patent: Oct. 27, 2020

(54) COARSE-TO-FINE HAND DETECTION METHOD USING DEEP NEURAL NETWORK

(71) Applicants: MIDEA GROUP CO., LTD., Foshan (CN); SEETATECH (BEIJING) TECHNOLOGY CO., LTD., Beijing (CN)

(72) Inventors: Zixuan Yang, Beijing (CN); Dahai Yu, Shenzhen (CN); Zhuang Liu, Beijing (CN); Junyang Zhou, Shenzhen (CN); Xiujuan Chai, Beijing (CN); Shiguang Shan, Beijing (CN); Xilin Chen, Beijing (CN)

(73) Assignees: MIDEA GROUP CO., LTD., Foshan (CN); SEETATECH (BEIJING) TECHNOLOGY CO., LTD., Beijing (CN)

( * ) Notice: Subject to any disclaimer, the term of this patent is extended or adjusted under 35 U.S.C. 154(b) by 120 days.

(21) Appl. No.: 16/228,436

(22) Filed: Dec. 20, 2018

(65) Prior Publication Data

US 2019/0122041 A1 Apr. 25, 2019

Related U.S. Application Data

(63) Continuation of application No. PCT/CN2017/087354, filed on Jun. 6, 2017.

(51) Int. Cl.
*G06K 9/00* (2006.01)
*G06K 9/46* (2006.01)
(Continued)

(52) U.S. Cl.
CPC ..... *G06K 9/00389* (2013.01); *G06K 9/00375* (2013.01); *G06K 9/4628* (2013.01);
(Continued)

(58) Field of Classification Search
CPC .......... G06K 9/00389; G06K 9/00375; G06K 9/4628; G06K 9/6271; G06K 9/6857;
(Continued)

(56) References Cited

U.S. PATENT DOCUMENTS

| 10,007,863 B1* | 6/2018 | Pereira | G06T 7/60 |
| 2008/0019589 A1* | 1/2008 | Yoon | G06K 9/00355 |
| | | | 382/165 |

(Continued)

FOREIGN PATENT DOCUMENTS

| CN | 105046196 A | 11/2015 |
| CN | 105981041 A | 9/2016 |

(Continued)

OTHER PUBLICATIONS

Kaipeng Zhang et al., "Joint Face Detection and Alignment Using Multitask Cascaded Convolutional Networks," IEEE Signal Processing Letters, vol. 23, No. 10, Oct. 2016, 5 pgs.

(Continued)

*Primary Examiner* — Ming Y Hon
(74) *Attorney, Agent, or Firm* — Morgan, Lewis & Bockius LLP (57) ABSTRACT

Embodiments provide a process to identify one or more areas containing a hand or hands of one or more subjects in an image. The detection process can start with coarsely locating one or more segments in the image that contain portions of the hand(s) of the subject(s) in the image using a coarse CNN. The detection process can then combine these segments to obtain the one or more areas capturing the hand(s) of the subject(s) in the image. The combined area(s) can then be fed to a grid-based deep neural network finely detect area(s) in the image that contain only the hand(s) of the subject(s) captured.

19 Claims, 9 Drawing Sheets

(51) Int. Cl.
*G06K 9/62* (2006.01)
*G06K 9/68* (2006.01)
*G06T 7/11* (2017.01)

(52) U.S. Cl.
CPC ......... *G06K 9/6271* (2013.01); *G06K 9/6857* (2013.01); *G06T 7/11* (2017.01); *G06T 2207/20081* (2013.01); *G06T 2207/20084* (2013.01); *G06T 2207/30196* (2013.01)

(58) Field of Classification Search
CPC .... G06K 9/00355; G06K 9/6296; G06T 7/11; G06T 2207/20081; G06T 2207/20084; G06T 2207/30196; G06N 3/08
See application file for complete search history.

(56) References Cited

U.S. PATENT DOCUMENTS

| | | | |
|---|---|---|---|
| 2010/0166258 A1* | 7/2010 | Chai | G06K 9/00389 382/103 |
| 2013/0278504 A1* | 10/2013 | Tong | G06K 9/00355 345/158 |
| 2015/0071494 A1* | 3/2015 | Koryakovskiy | G06K 9/00208 382/103 |
| 2015/0117760 A1 | 4/2015 | Wang et al. | |
| 2015/0347831 A1* | 12/2015 | Tamatsu | G06K 9/00805 382/156 |
| 2016/0335524 A1* | 11/2016 | Bremer | G06T 7/0012 |
| 2016/0379137 A1* | 12/2016 | Burger | G06F 9/46 706/12 |
| 2017/0098140 A1* | 4/2017 | Wang | G06T 3/40 |
| 2017/0206431 A1* | 7/2017 | Sun | G06F 16/5838 |
| 2017/0304732 A1* | 10/2017 | Velic | A63F 13/65 |
| 2018/0137644 A1* | 5/2018 | Rad | G06K 9/00208 |
| 2018/0300540 A1* | 10/2018 | Swisher | G06K 9/4628 |
| 2019/0012768 A1* | 1/2019 | Tafazoli Bilandi | G06T 1/20 |
| 2019/0102601 A1* | 4/2019 | Karpas | G06N 3/084 |
| 2019/0188865 A1* | 6/2019 | Du | G06K 9/00375 |

FOREIGN PATENT DOCUMENTS

| | | |
|---|---|---|
| CN | 106650699 A | 5/2017 |
| JP | 2006323779 A | 11/2006 |
| JP | 2010102396 A | 5/2010 |
| JP | 2013114660 A | 6/2013 |
| KR | 20170046519 A | 5/2017 |
| WO | WO2015180100 A1 | 12/2015 |
| WO | WO2016107103 A1 | 7/2016 |
| WO | WO2016165060 A1 | 10/2016 |
| WO | WO2017007626 A1 | 1/2017 |

OTHER PUBLICATIONS

Le T. Hoang Ngan et al., "Robust hand detection in Vehicles," 2016 23rd International Conference on Pattern Recognition (ICPR), IEEE, Dec. 4, 2016, 6 pgs.
Midea Group Co., Ltd., International Search Report and Written Opinion, PCT/CN2017/087354, dated Mar. 5, 2018, 10 pgs.
Midea Group Co., Ltd., First Office Action, CN201780003226.9, dated Jan. 10, 2020, 28 pgs.
Midea Group Co., Ltd., Extended European Search Report, EP17911404.6, dated May 31, 2019, 11 pgs.
Minglei Li et al., "Precise hand segmentation from a single depth image," 2016 23rd International Conference on Pattern Recognition (ICPR), IEEE, Dec. 4, 2016, 6 pgs.
Sven Bambach et al., "Viewpoint Integration for Hand-Based recognition of Social Interactions from a First-Person View," Inernational conference on multimodal Interaction, ACM, 2 Penn Plaza, Suite 701, New York, NY, Nov. 9, 2015, 4 pgs.
Sven Bambach et al., Lending a Hand: Detecting Hands and Recognition Activities in Complex Egocentric Interactions, 2015 IEEE International Conference on Computer Vision (ICCV), IEEE, Dec. 7, 2015, 9 pgs.
Wu Chengdeng et al., "The Recognition of Vehicles' License Plates Characters Based on Rough Grid Neural Network" Journal of Shenyang University of Architecture (Natural Science Edition). vol. 23, No. 4, 5 pgs.
Midea Group Co., Lt., Notification of Reasons for Refusal, JP2018567662, dated May 19, 2019, 7 pgs.
Midea Group Co., Ltd., Notice of Submission of Special Opinion, KR1020197003100, dated Jun. 2, 2020, 14 pgs.
Takayoshi Yamashita, et al., "Extraction of Hand-shaped regions by Deep Convolutional Neural Network," SSII2014, 20th Image Sensing Symposium Proceedings, Japan, Image Sensing Technology Workshop, Jun. 11, 2014, 13 pgs.

* cited by examiner

COARSE-TO-FINE HAND DETECTION METHOD USING DEEP NEURAL NETWORK

PRIORITY CLAIM AND RELATED APPLICATION

This application is a continuation application of PCT/CN2017/087354, entitled "A COARSE-TO-FINE HAND DETECTION METHOD USING DEEP NEURAL NETWORK" filed on Jun. 6, 2017, which is incorporated herein by reference in its entirety.

TECHNICAL FIELD

The present application relates to the field of computerized hand detection.

BACKGROUND

Some existing hand detection techniques rely on machine learning for determining the position and size of the hand(s) captured in image. Under these techniques to work, a training set is typically built to produce a reliable classification or regression function. Noise and distortion of the detected hand and of the underlying training set may inhibit reliable classification or regression.

Hand detection is challenging due to various hand postures, illumination changes, complex background, skin color interferences in images and so on. A machine learning process for hand detection typically requires a large amount of training data representing the positions and sizes of the hands that would be observed in a non-controlled scenario.

Training data for these techniques can be acquired by manual annotation. The positions and sizes of hands can be extracted from the training data. Some of these techniques use convolutional neural networks (CNNs) that can be trained to extract features of hand. For example, Chinese patent application number CN1057181078A, entitled "Egocentric vision in-the-air hand-writing and in-the-air interaction method based on cascade convolution nerve network", filed Jan. 19, 2016 describes a CNN that can be trained to analyze RGB images of a subject's hand from a particular view point. Chinese patent application number CN1057181078A is incorporated by reference herein. Deep CNNs, such as the ones described in CN1057181078A, have good performance in hand detection.

It has been proved that deep CNNs have good performance in capturing feature, but CNNs based techniques typically require large computing power for both training and testing. One reason is to achieve higher accuracy, the CNN based hand detection techniques require more layers in the CNN and thus needs more computing power. The use of these deep CNNs can also be time-consuming. Accordingly, there is a need to improve the existing CNN based hand detection techniques for higher efficiency.

BRIEF SUMMARY

Embodiments can provide a process to detect one or more areas containing a hand or hands of a subject or subjects in an image. The area(s) in the image detected by this process can then be fed to a gesture recognition process for recognizing the gesture of the detected hand(s). In some embodiments, the detection process can start with roughly locating one or more segments in the image that contain portions of the hand(s) of the subject(s) in the image using a coarse location network that is very simple and fast to be implemented. In those embodiments, the detection process can then combine these segments to obtain the one or more areas capturing the hand(s) of the subject(s) in the image. In some embodiments, the detection process can expand the combined area(s) in the image so that they can include some contextual information regarding the hand(s) of the subject(s), and can be registrated to grids that each grid cell has the same predetermined size. The expanded area(s) can then be fed to a fine grid-based detection network to detect the exact area(s) in the image that contain only the hand(s) of the subject(s) captured. Compared with the prior art CNN based hand detection techniques, embodiments in accordance with the disclosure can reduce the amount of input image data fed to the fine grid-based detection network by feeding only the area(s) in the individual image that are predicted to contain the hand(s) of the subject(s) and required context to the CNNs used in fine grid-based detection network. This can reduce the amount of the input data of the finely grid-based detection network and thus reduce the time for hand detection.

In some embodiments, a simple cascade CNN (e.g., two sub-stages) can be trained and used as the coarse location network to locate segments in images that contain hands of subjects. The located segments in a given image may contain different portions of the hands of the subjects. This can be understood as rough location of the subject's hand. The CNN used in such a coarse location network can be very small and simple to be implemented, so it needs relatively little computing resources for implementation. The hand portions in the located segments may overlap with one another. For example, a first located segment can contain a portion of the subject's hand that partially overlaps (in space) with that in a second located segment.

In some embodiments, a combining process is used to combine the aforementioned segments to obtain the area(s) in the image that captures the hand(s) of the subject(s) in the image. For example, when only one hand of the subject is captured in the image, the located segments can be combined to obtain an area in the image that captures the hand. As another example, when two hands of the subject are captured in the image, the located segments can be combined to form two areas, each capturing one hand of the subject, or one area capturing two hands of the subject. In some embodiments, multiple subjects may be captured in the image. In those embodiments, multiple areas in the image may be obtained such that each of the multiple areas captures one or more hands of the subjects in the image. However, since the accuracy of the coarse location network need not be high, there may be some areas that do not contain the hand. This can be corrected in the fine detection network lately.

In some embodiments, the combined area in the image is expanded to include more surrounding areas that surround the combined area. In one implementation, the image can be divided into grids and a predetermined number of grid cell surrounding the obtained area in the image can be applied to expand the combined area. In this way, some contextual information in the image relevant to the subject's hand may be acquired. Such contextual information can aid the CNN based detection to achieve higher accuracy. Moreover, the inclusion of the hand contextual information is targeted towards the detection of the hand of the subject while not overly including other irrelevant information in the image for hand detection. Accordingly, a higher accuracy and efficiency can be achieved for the CNN based hand detection using this combining process.

In some embodiments, a processed area described above can be sent to a grid-based detection network. The combined area can be divided into grids when fed to the fine grid-based detection network. In some embodiments, the grid-based detection network can include a CNN that can process each grid cell of the processed area to obtain an exactly position and size of the subject's hand captured in the processed area. This process can be understood as a fine detection of the subject's hand.

Other embodiments are directed to systems and computer readable media associated with methods described herein.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

In machine learning, a convolutional neural network (CNN, or ConvNet) is a type of feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation.

For image recognition, Convolutional neural networks (CNNs) typically can consist of multiple layers of receptive fields. These are small neuron collections which process portions of the input image. Unlike a regular Neural Network, the layers of a CNN can have neurons arranged in 3 dimensions: width, height, depth. (Note that "depth" herein refers to a third dimension of an activation volume, not the depth of a full Neural Network, which can refer to the total number of layers in a network.) For example, the input images in CIFAR-10 can have an input volume of activations, and the volume has dimensions 32×32×3 (width, height, depth respectively). A CNN can arrange its neurons in three dimensions: width, height, depth. Every layer of a CNN can transform the 3D input volume to a 3D output volume of neuron activations. For example, the CNN can have an input layer that holds the image data, so its width and height would be the dimensions of the image, and the depth would be 3 (Red, Green, Blue channels). Taking an RGB input image as an example, it can have 32×32×3 pixel values. That is the width has 32 pixels, the height has 32 pixels and the depth is 3 (i.e., 3 color channels R, G and B).

Hand detection is important for designing touchless interfaces for, e.g. home appliances such as air conditioners. Such interfaces can allow users to interact with home appliances using hand gestures, for example to control the home appliances. Object detection with deep CNNs has been successful. The methods in object detection can be used in hand detection with some changes. Key to these CNN based hand detection is diverse datasets capturing various hand positions and sizes. The datasets for these techniques typically include images that capture a subject (e.g., a human) with its hand(s). The images typically capture the subject from a distance showing the person's face and/or body. In many cases, the images can also capture backgrounds of the subject. These images are then fed to the deep CNNs for hand detection.

One insight provided by the inventors of the present disclosure is that existing CNN based techniques for hand detection are typically time consuming due to the input data (e.g., images) contain lots of information irrelevant to the hands of the subjects in the image. In many cases, the input data has to be processed through different layers in the deep CNNs employed by these techniques for detecting the hands. This requires lots of computing power and thus can become time consuming. One solution to this problem as provided by the present disclosure is to use a simple CNN as a coarse location network to roughly locate one or more areas in an image of a subject that contains one or more hands of the subject. These areas can then be further processed using a grid-based detection network to perform a finer detection of image area(s) that contains only the hand of the subject. In this way, not only does less information need to be processed by the deep CNN employed by a CNN based hand detection technique, but also more accuracy can be achieved as the input data only contain data relevant to the hand(s) of the subject.

The hand detection in accordance with the present disclosure can be generally divided into three stages. In the first stage, an image of a subject can be received. This image may contain information irrelevant to the hand(s) of the subject in the image. Also in the first stage, a simple cascade CNN (e.g., two sub-stages) can be used as a coarse location network to roughly locate one or more segments in the image contain portions of the hand(s) of the subject. Such location of the subject's hand(s) can be understood as a coarse location of the subject's hand. These segments may contain portions of the subject's hand(s) that overlap with one another.

In the second stage, the segments located by the coarse location network can be processed to obtain one or more areas in the image predicted to contain the subject's hand and as well some contextual information surrounding the subject's hand. When there is only one hand of the subject is captured in the image, one area may be obtained. When there are two hands of the subject are captured in the image, one area containing two hands or two areas may be obtained. Of course when there are multiple subjects captured in the image, multiple areas may be obtained. However, since the accuracy of the coarse location network need not be high, there may be some areas that do not contain the hand. This can be corrected in the third stage.

In the third stage, the areas in the image as obtained in the second stage can be fed to a grid-based detection network for a finer identification of image area(s) that contain only the subject's hand. The result of the third stage is a part of the input image that only contains the subject's hand. This stage can be understood as a finer detection of the subject's hand.

Figure 1:
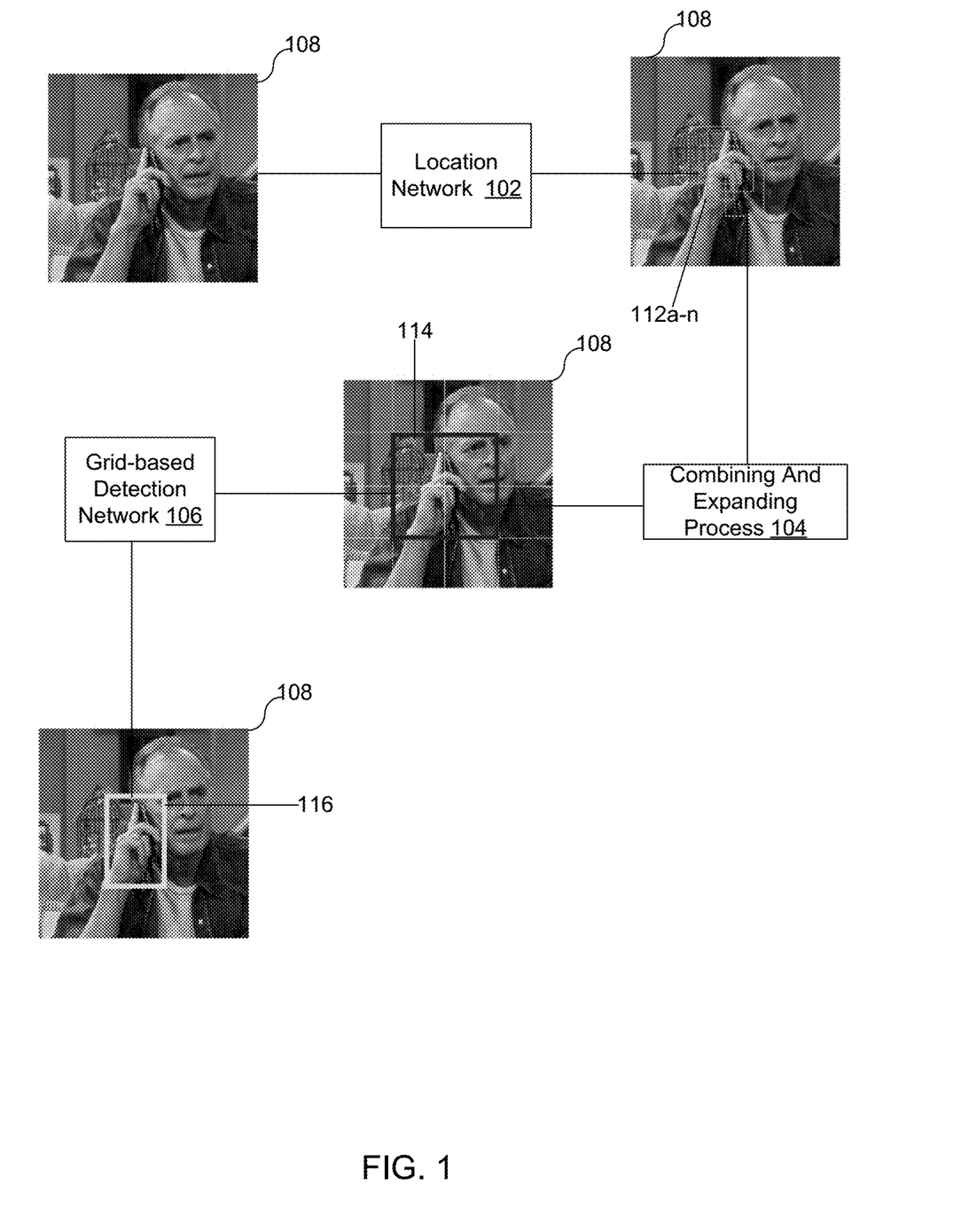
FIG. 1 illustrates, conceptually, detecting a hand region in an image in accordance with the disclosure
Figure 2:
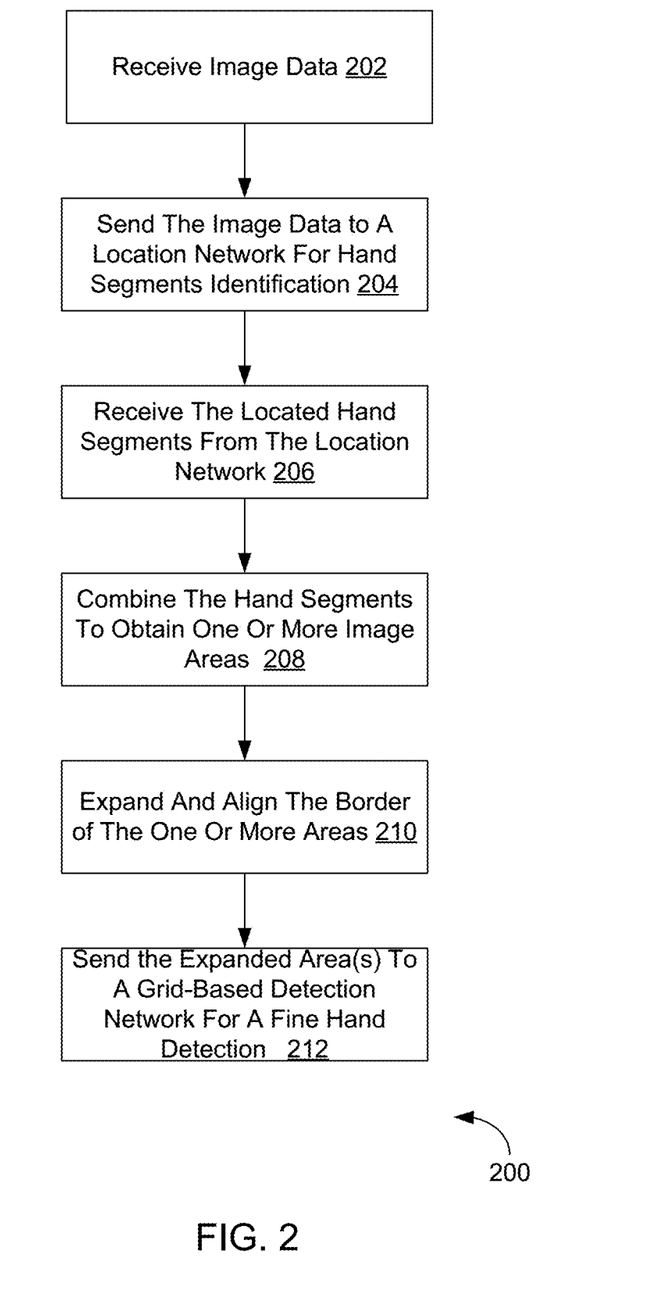
FIG. 2 illustrates one exemplary method for detecting a hand of a subject captured in an image in accordance with the disclosure.

FIG. 1 illustrates, conceptually, identifying a subject's hand captured in an image in accordance with the disclosure. FIG. 2 illustrates one exemplary method 200 for identifying a hand of a subject captured in an image in accordance with the disclosure. FIG. 1 and FIG. 2 will be described with reference to each other. First referring to FIG. 2, the particular series of processing steps depicted in FIG. 2 is not intended to be limiting. It is appreciated that the processing steps may be performed in an order different from that depicted in FIG. 2 and that not all the steps depicted in FIG. 2 need be performed. In certain implementations, the method 200 may be generated by a system, such as the one shown in FIG. 9.

In some embodiments, the method depicted in method 200 may be generated in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At 202, data of an image can be received. An example of the image that can be received at 202 is illustrated as 108 shown in FIG. 1. As shown in FIG. 1, the image 108 can include a subject, e.g., a person and the subject can be captured to have at least one hand positioned in a certain way. A goal of the hand detection is to find out the position and size of the subject's hand. A hand region may have a definition as to one or more parameters regarding the hand. The results of hand detection can be used for subsequent gesture recognition. In some embodiments, the hand gesture may be translated or mapped to one or more control commands for controlling a home appliance.

Referring back to FIG. 2. At 204, the image data received at 202 can be sent to a coarse location network for roughly locating one or more segments in the image that contain portions of the hand of the subject. Referring to FIG. 1, the subject in this example has one hand captured in the image 108. A goal of step 204 is to identify multiple segments, such as 112a-n shown in this example, in the image 108, each of these segments can contain at least a portion of the hand of the subject captured in the image 108. One or more methods can be used to achieve the segments location performed at 204. In some implementations, the segments can be expressed as follows:

$$S0=\{R0\_1, R0\_2, \ldots, R0\_n\}$$

wherein R0_i can be further expressed as follows:

$$R0\_i=(x0\_i, y0\_i, w0\_i, h0\_i, s0\_i)$$

wherein (x0_i, y0_i) represents the coordinate of the $i_{th}$ segment predicted to have a portion of the subject's hand captured in image 108; (w0_i, h0_i) represents the width and height of the $i_{th}$ segment and the s0_i represents a degree of confidence of the $i_{th}$ in terms of having a portion of the subject's hand captured in image 108.

Figure 3:
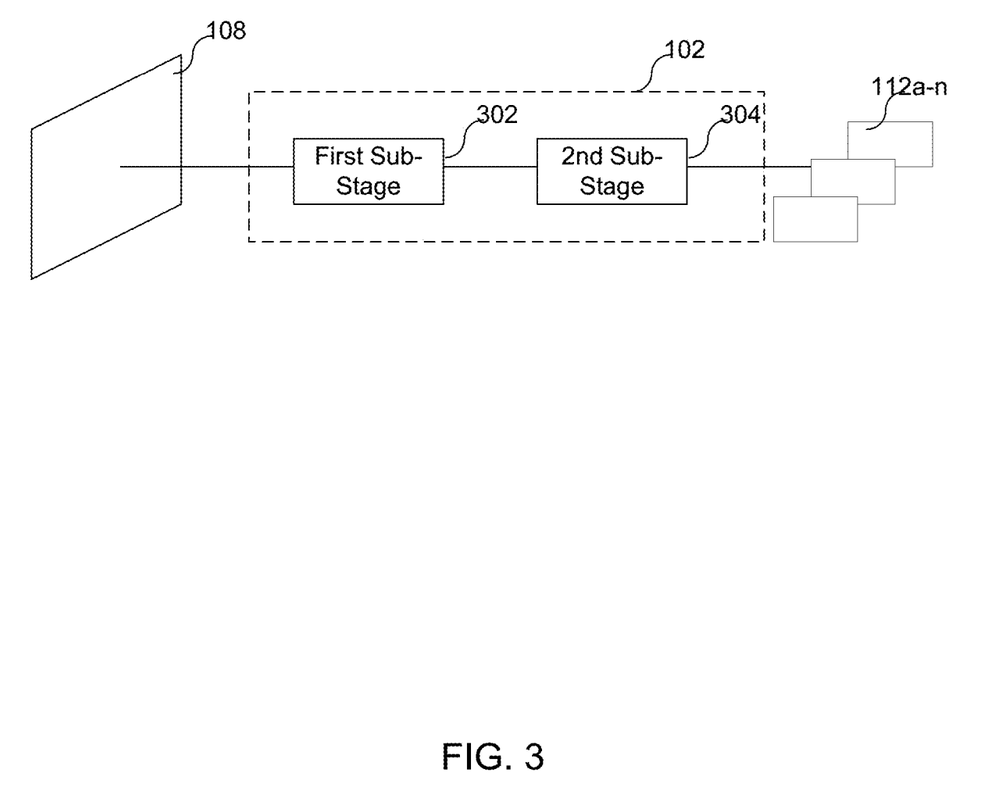
FIG. 3 illustrates a two sub-stages cascade CNN can be used for coarse location network to locate segments containing portions of a subject's hand captured in an image.

In some examples, a simple cascade CNN may be used for the coarse hand segment location at 204. As mentioned above, a goal of step 204 is to coarsely located segments 112a-n in the image 108. For achieving this goal, the coarse CNN 102 employed may not be too deep. In one implementation, a two sub-stages cascade CNN can be used to locate segments 112a-n in image 108. This is illustrated in FIG. 3. As shown, the cascade CNN used in the coarse location network 102 shown in FIG. 1 may have a first sub stage 302 and a second sub stage connected in series such that the image data of image 108 can be fed to the coarse CNN 102 and the segments 112a-n can be located. In this way, much of the captured information in image 108 irrelevant to the subject's hand can be removed from further processing and data relevant to the subject's hand can be focused on for further processing.

Figure 4:
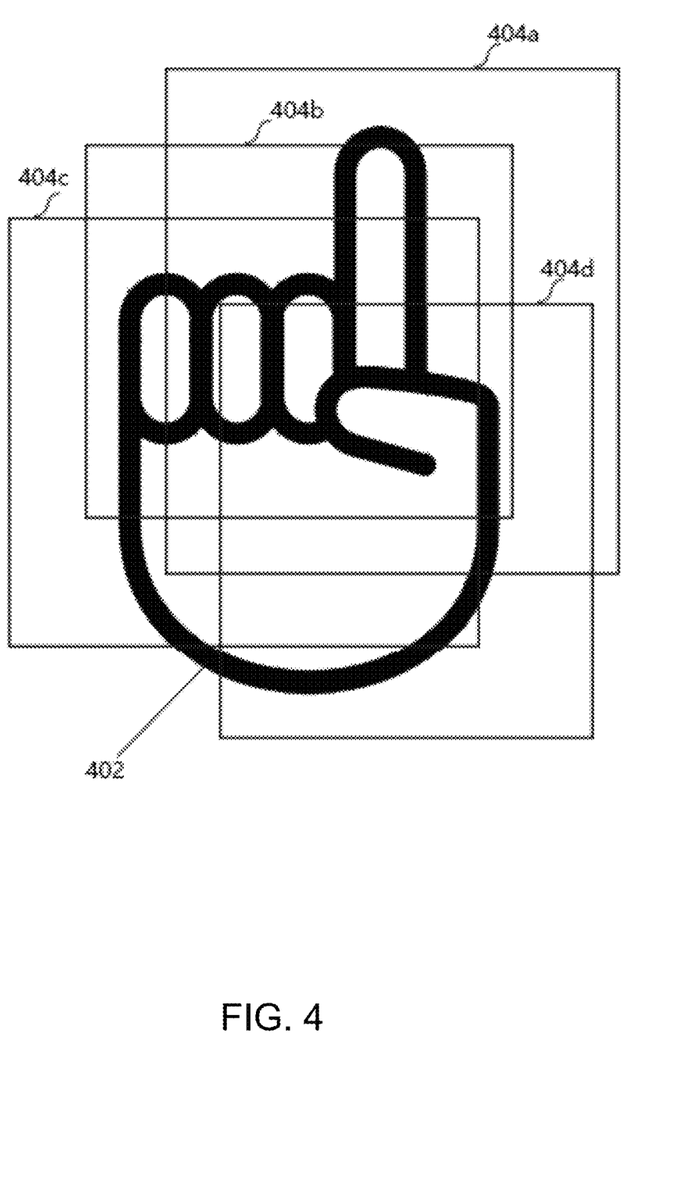
FIG. 4 illustrates segments located by the coarse location network in accordance with the disclosure can contain multiple portions of a hand of a subject.

Referring back FIG. 2, at 206, the one or more image segments located at 206 can be received from the coarse location network. It should be understood, the individual segments received at 206 may contain portions of the subject's hand. This is illustrated in FIG. 4. As shown in FIG. 4, four segments 404a-d are predicted for containing a portion of the subject's hand 402. As illustrated, the individual segments can have overlapping hand portions with one another. In this example, 404a overlaps with all the other three segments, and so do the other three segments.

Referring back FIG. 2, at 208, the segments received at 206 can be combined to obtain one or more areas in the image that are predicted to contain the subject's hand(s). As mentioned above, each area obtained at 208 may contain a different hand of a subject captured in the image. The goal of step 208 is to find the area(s) that contain the hand(s) of the subject, and avoid the overlap between the input of fine grid-based detection network to reduce the calculation.

A given area set S1 that can be obtained at 208 by combining segments received at 206 can be expressed as follows:

$$S1=\{R1\_1, R1\_2, \ldots, R1\_m\}$$

wherein R1_k represents the $k^{th}$ area in the S1 area set. R1_k can be obtained from overlapping R0 segments, for example R0_i and R0_j. Suppose that R0_i has the following parameters: R0_i=(x0_i, y0_i, w0_i, h0_i, s0_i); R0_j has the following parameters: R0_j=(x0_j, y0_j, w0_j, h0_j, s0_j); and R1_k has the following parameters (x1_k, y1_k, w1_k, h1_k). Then R1_k can be obtained using the following relationship:

$$x1\_k=\min(x0\_i, x0\_j)$$

$$y1\_k=\min(y0\_i, y0\_j)$$

$$w1\_k=\max(x0\_i+w0\_i-1, x0\_j+w0\_j-1)-x1\_k+1$$

$$h1\_k=\max(y0\_i+h0\_i-1, y0\_j+w0\_j-1)-y1\_k+1$$

Figure 5:
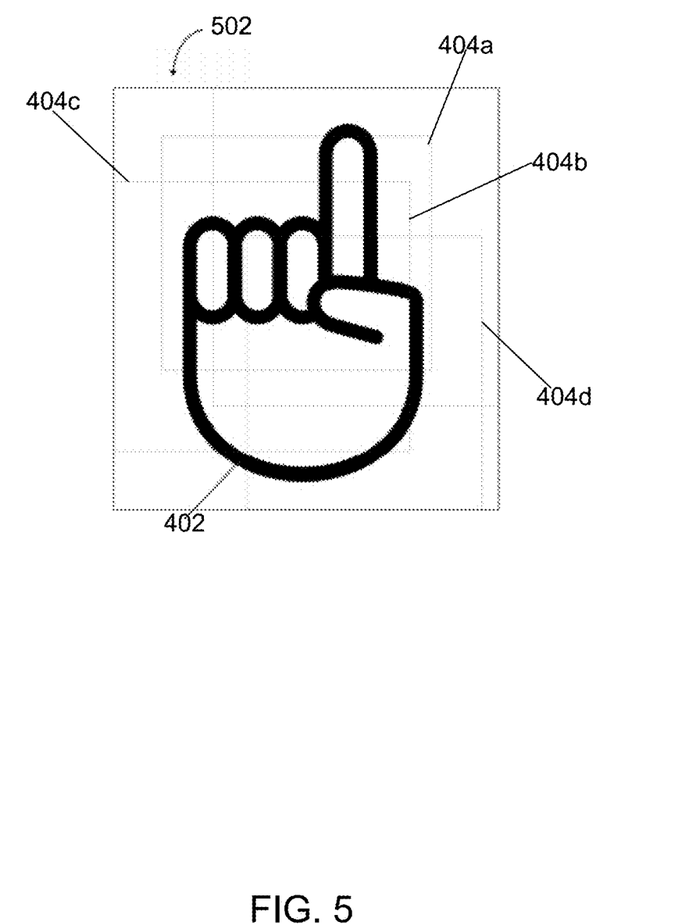
FIG. 5 illustrates one example of an area that can be obtained by combining the located segments.

FIG. 5 illustrates one example of an area 502 (S1) that can be obtained by combining segments located at 204 as illustrated in FIG. 4.

Figure 6:
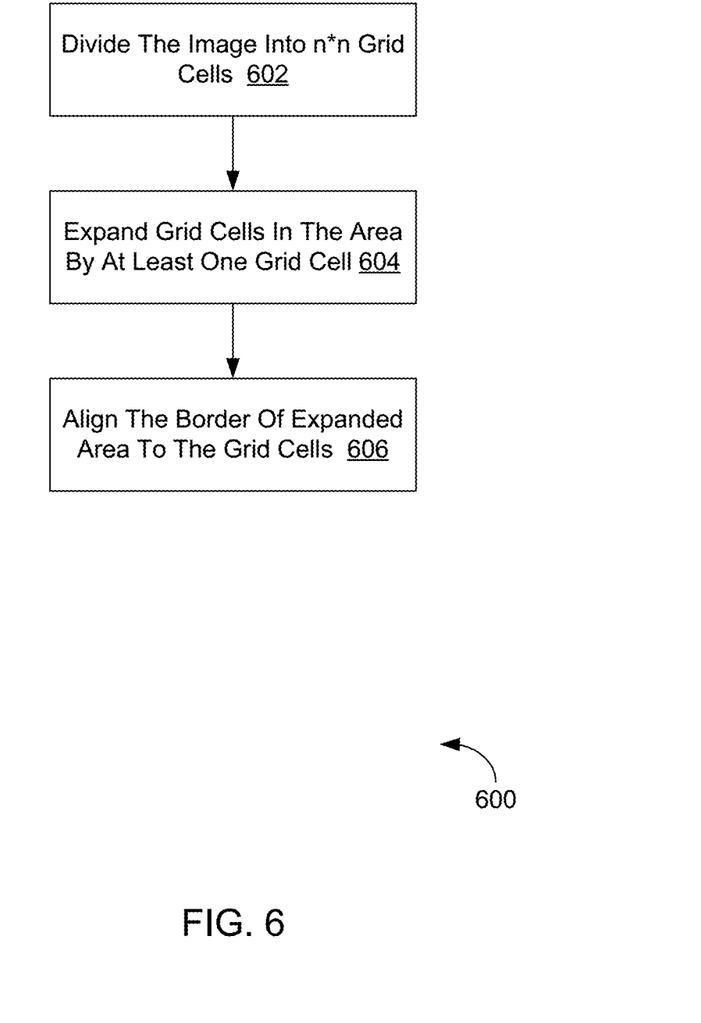
FIG. 6 illustrates one exemplary flowchart showing some operations involved in expanding an obtained area containing a hand of a subject captured in an image.

Referring back to FIG. 2, at 210 the area obtained at 208 can be expanded. A goal of step 208 is to include some contextual information relevant to the subject's hand captured in the area obtained 208 as the contextual information may be helpful for further identification of the subject's hands at step 212. Another goal of step of 208 is to expand the area such that it can be divided to grids that the size of the grid cell is predetermined. FIG. 6 illustrates one exemplary flowchart 600 showing some operations that can be included in step 208. FIG. 6 will be described with reference to FIG. 2.

At 602, the image received at 202, e.g., image 108 can be divided into n*n grids. Assume image 108 has a width of W and a height of H, then an individual image block can have the following dimension: width=W/n; height=H/n.

At 604, each of the area obtained 208 can be expanded by at least one grid cell size to obtain a new expanded area. As illustration, using R1_i as an example, R1_i has the following parameter: R1_i=(x1_i, y1_i, w1_i, h1_i). Suppose after the expansion the area is R2_i and has the following parameters: R2_i=(x2_i, y2_i, w2_i, h2_i). The relationship between R1_i and R2_i can be expressed as follows:

$$x2\_i = x1\_i - w > 0 \,?\, x1\_i - w : 0$$

$$y2\_i = y1\_i - h > 0 \,?\, y1\_i - h : 0$$

$$w2\_i = x1\_i + w1\_i - 1 + w < W - 1 \,?\, x1\_i + w1\_i + w - x2\_i : W - 1$$

$$h2\_i = y1\_i + h1\_i - 1 + h < H - 1 \,?\, y1\_i + h1\_i + h - h2\_i : H - 1$$

wherein w represents the width of an grid cell, i.e., W/n; and h represents the height of the grid cell, i.e., H/n. It should be understood the conditional expressions above are to account for situations where the expansion of R1_i by at least one image block may cross the border of the image received at 202. In those cases, border of the image received 202 will be used as the border of the expanded block, R2_i.

At 606, the border of expanded area can be aligned to the grids. Suppose that S3 is the area set after the aligning at 606, and S3 may have m area R3 that contains the subject's hand and some contextual information; and can be expressed as follows: S3={R3_1, R3_2, . . . R3_i . . . , R3_m}. R3_i represents the ith area in S3 and can have the following parameters: R3_i=(x3_i, y3_i, w3_i, h3_i). R3_i can then be expressed as follows:

$$x3\_i = \lfloor x2\_i / w \rfloor * w$$

$$y3\_i = \lfloor y2\_i / h \rfloor * h$$

$$w3\_i = \lceil (x2\_i + w2\_i - 1) / w \rceil * w$$

$$h3\_i = \lceil (y2\_i + h3\_i - 1) / h \rceil * h$$

wherein w and h are the width and height of a grid cell. An example area S3 is illustrated in FIG. 1 as 114. As can be seen, the subject's hand and some context can be identified in the image through the operations described above.

Figure 7:
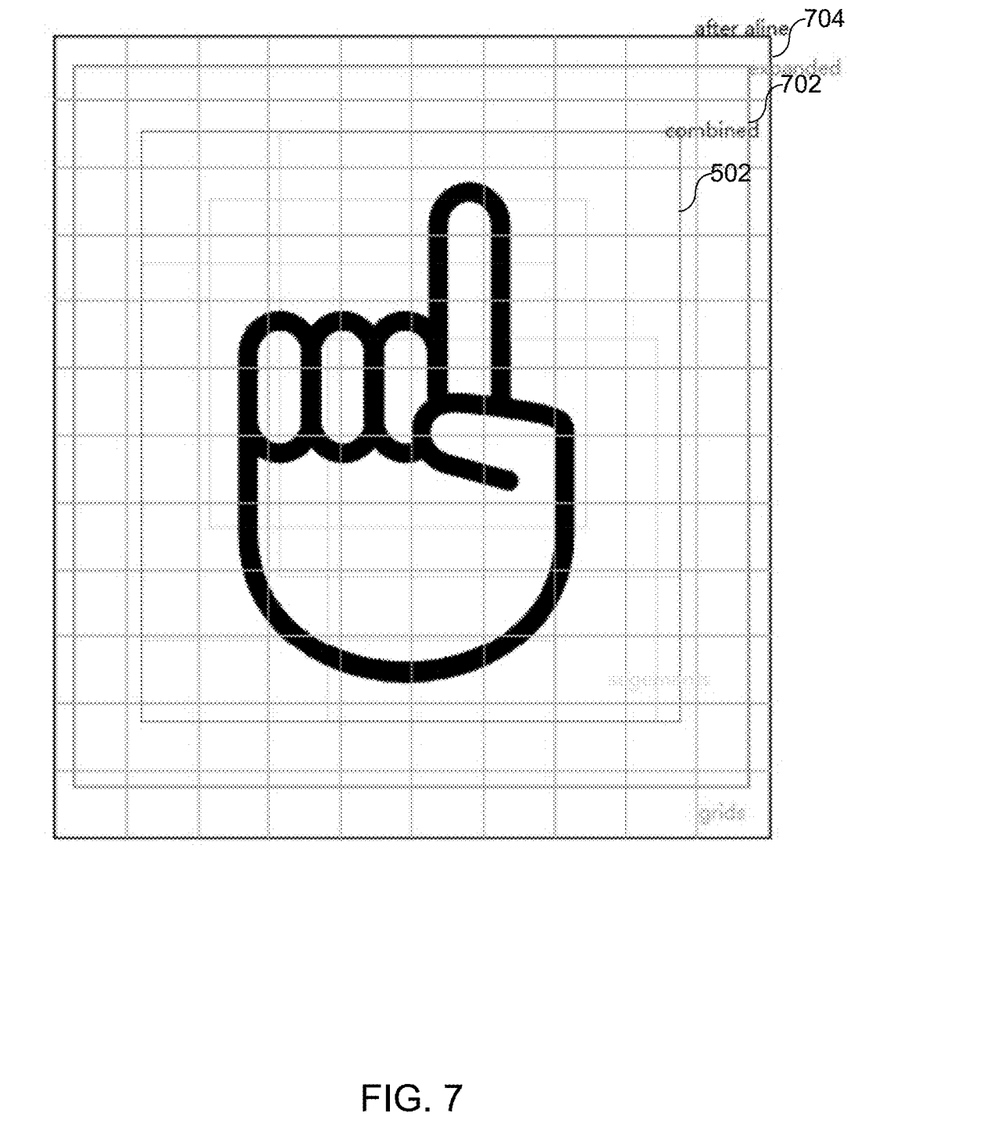
FIG. 7 illustrates one example of an image area that is obtained by the process shown in FIG. 6.

FIG. 7 illustrates one example of an image area that is obtained by the process shown in FIG. 6. As shown in this example, the first image area that is combined as shown in FIG. 5 can be first expanded by one grid cell to obtain an expanded area 702. The border of the expanded area 702 can then be aligned to match grid cells in in the image to obtain another image area 704.

Referring back to FIG. 2, at 212, the image area obtained at 210, such as the area 704 shown in FIG. 7, can be sent to a grid-based detection network for a more accurate (fine) identification of the subject's hand as captured in the image area obtained at 210. A goal of 211 is to ensure the input of the fine grid-based detection network has enough context for fine detection and can be divided to grids that the size of grid cell is predetermined. The fine grid-based detection network is conceptually illustrated in FIG. 1 as 106. In some implementations, the fine detection network 106 can have multiple layers (e.g., more than 3 layers). The fine detection network 106 can be designed to process images by dividing the received images to grids that the size of grid cell is w*h as described above (i.e., w=W/n; and h=H/n). The fine detection network 106 can be designed to process each grid cell in the image received by the fine detection network 106 with a confidence score in terms of its relevance to the subject's hand. In implementations, a threshold confidence score can be predetermined such that image blocks having confidence scores above the threshold confidence score may be combined at 212 to obtain an identification of the subject's hand. This is illustrated in FIG. 1, the hand identification 116 can be obtained by sending the image area 114 to the fine detection network 106. Comparing the image area 114 and 116, area 116 is more focused on the subject's hand and is smaller than area 114.

In some implementations, the coarse location network 102 can be trained by training data using a Batch Gradient Descent method. The training data may include multiple RGB images with manual markings of positions and size of hands of subjects in these images. For example, a label may be defined for a subject's hand captured in a given image in the training data. Coordinates of the up left corner and bottom right corner of the labels may be marked as the training data. Other methods of manual marking are contemplated.

For the fine detection network 106 training, the training data used to train coarse location network can be first sent to the coarse location network 102 to obtain the segments in accordance with step 204. Suppose the result set of this is W0, then the identified segments in the result set W0 can be compared with the manual marking in the image to determine if all of the markings are covered in the result set. If one or more markings are not covered by the result set W0, one or more segments covering these markings may be added to result set W0 in accordance with steps 208 and 210 to obtain a new set W1. The new set W1 can then be sent to the coarse location network 106 along with the training data (with the manual markings of the hands of the subject) to train the second CNN 106. In some implementations, a Batch Gradient Descent method may be used to train the coarse location network 106 using such data.

Figure 8:
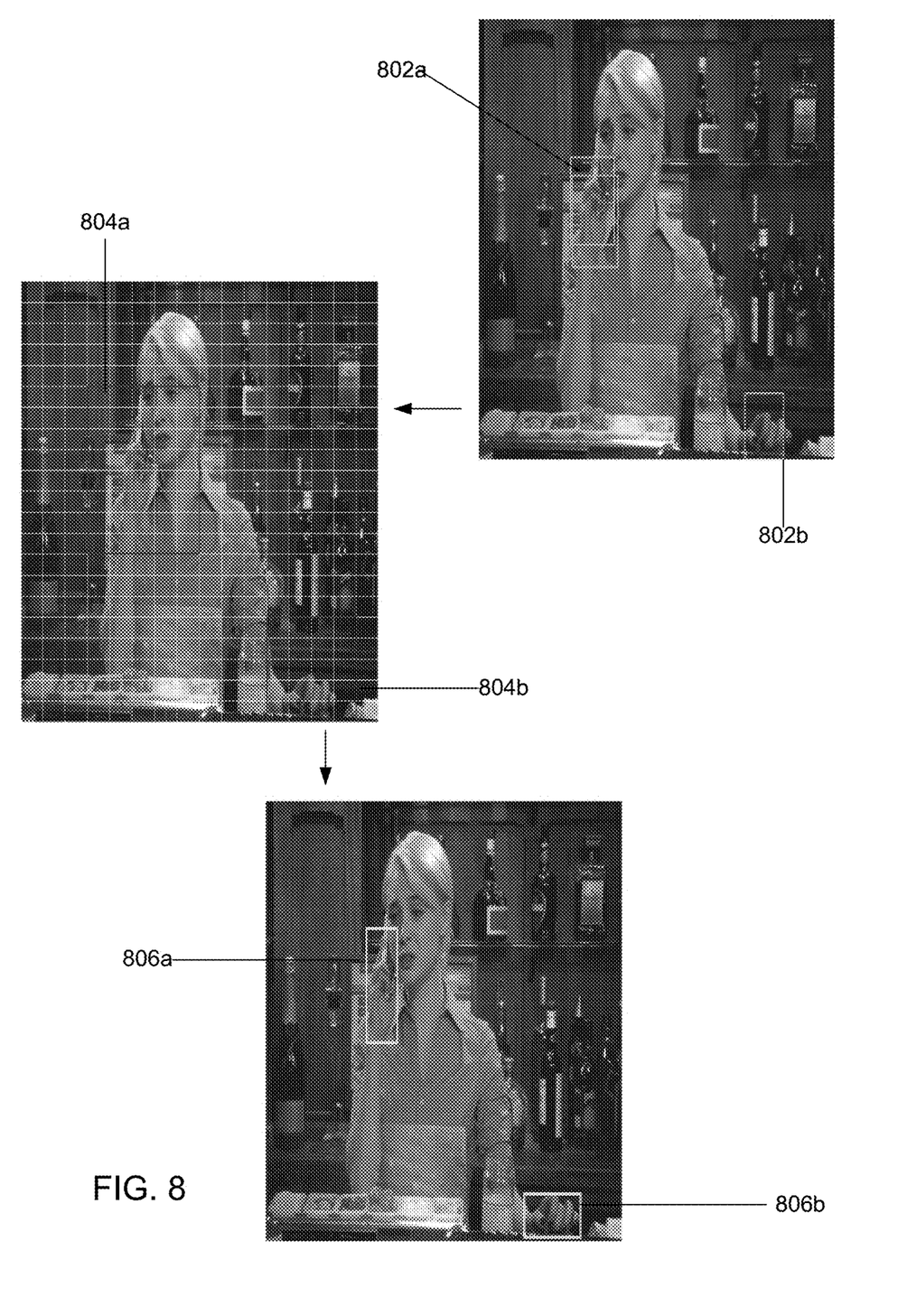
FIG. 8 illustrates conceptually multiple hands of a subject can be identified using the method shown in FIG. 2.

In some implementations, more than one hand of a subject may be identified using the method illustrate in FIG. 1 and FIG. 2. This is conceptually illustrated in FIG. 8. As can be seen, segments 802 of each of the subject's hands, i.e., 802a and 802b can be first located using the coarse location network 102. Segments 802a can then be processed into 804a and segments 802b can then be processed into 804b using the combining and expand process 104. Areas 804a and 804b can be further processed using the fine grid-based detection network 106 to obtain an identification of the subject's right hand 806b and an identification of the subject's left hand 806a.

Figure 9:
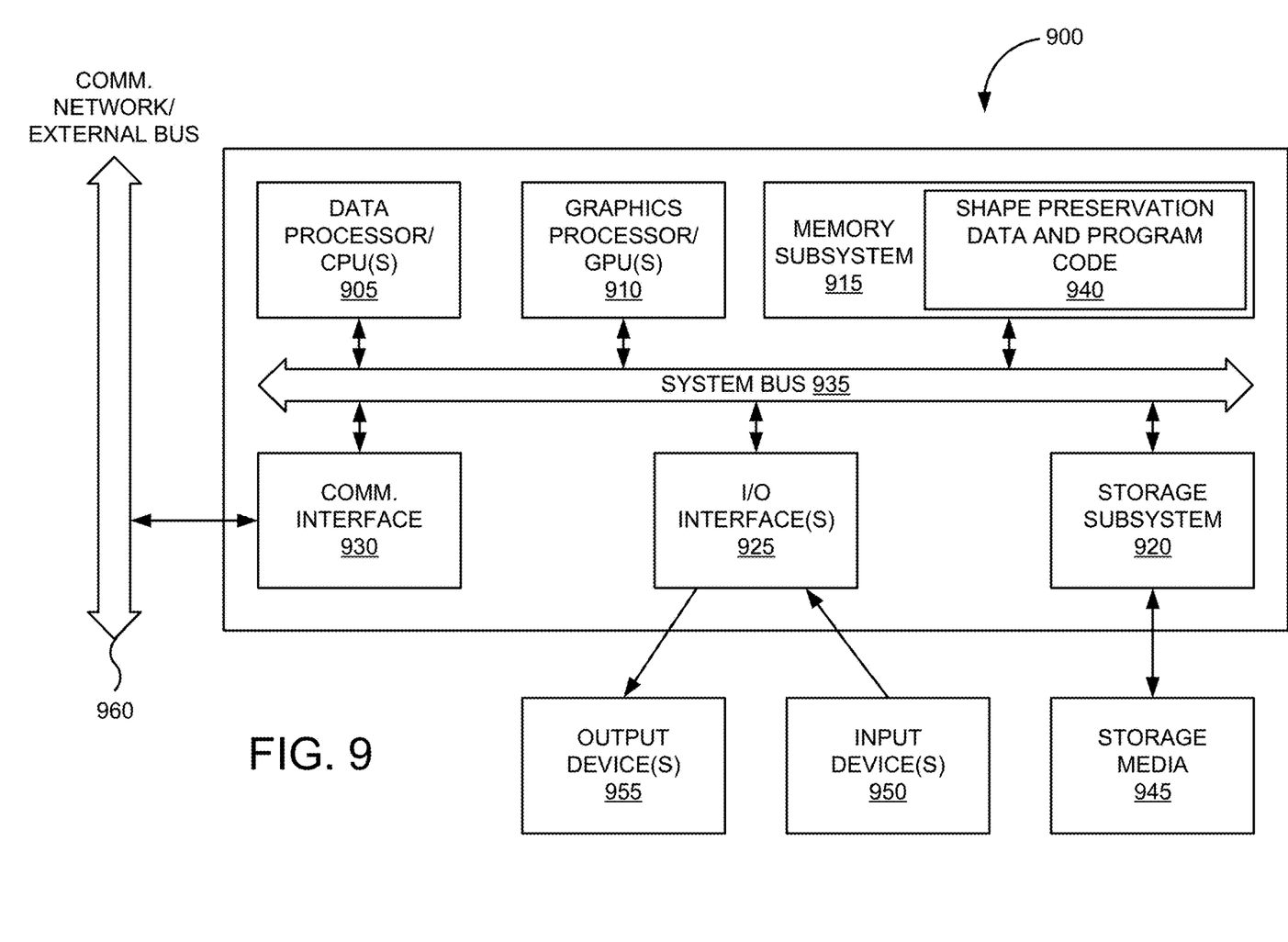
FIG. 9 is a block diagram of computer system that may incorporate an embodiment, be incorporated into an embodiment, or be used to practice any of the innovations, embodiments, and/or examples found within this disclosure.

FIG. 9 is a block diagram of computer system 900. FIG. 9 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 900 and any of its components or subsystems can include hardware and/or software elements configured for performing methods described herein.

Computer system 900 may include familiar computer components, such as one or more one or more data processors or central processing units (CPUs) 905, one or more graphics processors or graphical processing units (GPUs) 910, memory subsystem 915, storage subsystem 920, one or more input/output (I/O) interfaces 925, communications interface 930, or the like. Computer system 900 can include system bus 935 interconnecting the above components and providing functionality, such connectivity and inter-device communication.

The one or more data processors or central processing units (CPUs) 905 can execute logic or program code or for providing application-specific functionality. Some examples of CPU(s) 905 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 910 can execute logic or program code associated with graphics or for providing graphics-specific functionality. GPUs 910 may include any conventional graphics processing unit, such as those provided by conventional video cards. In various embodiments, GPUs 910 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 910 may include any number of registers, logic units, arithmetic units, caches, memory interfaces, or the like.

Memory subsystem 915 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 915 can include data and program code 940.

Storage subsystem 920 can also store information using machine-readable articles, information storage devices, or computer-readable storage media. Storage subsystem 920 may store information using storage media 945. Some examples of storage media 945 used by storage subsystem 920 can include floppy disks, hard disks, optical storage media such as CD-ROMS, DVDs and bar codes, removable storage devices, networked storage devices, or the like. In some embodiments, all or part of data and program code 940 may be stored using storage subsystem 920.

The one or more input/output (I/O) interfaces 925 can perform I/O operations. One or more input devices 950 and/or one or more output devices 955 may be communicatively coupled to the one or more I/O interfaces 925. The one or more input devices 950 can receive information from one or more sources for computer system 900. Some examples of the one or more input devices 950 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 950 may allow a user of computer system 900 to interact with one or more non-graphical or graphical user interfaces to enter a comment, select objects, icons, text, user interface widgets, or other user interface elements that appear on a monitor/display device via a command, a click of a button, or the like.

The one or more output devices 955 can output information to one or more destinations for computer system 900. Some examples of the one or more output devices 955 can include a printer, a fax, a feedback device for a mouse or joystick, external storage systems, a monitor or other display device, a communications interface appropriately configured as a transceiver, or the like. The one or more output devices 955 may allow a user of computer system 900 to view objects, icons, text, user interface widgets, or other user interface elements. A display device or monitor may be used with computer system 900 and can include hardware and/or software elements configured for displaying information.

Communications interface 930 can perform communications operations, including sending and receiving data. Some examples of communications interface 930 may include a network communications interface (e.g. Ethernet, Wi-Fi, etc.). For example, communications interface 930 may be coupled to communications network/external bus 960, such as a computer network, a USB hub, or the like. A computer system can include a plurality of the same components or subsystems, e.g., connected together by communications interface 930 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 900 may also include one or more applications (e.g., software components or functions) to be executed by a processor to execute, perform, or otherwise implement techniques disclosed herein. These applications may be embodied as data and program code 940. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 915 and/or storage subsystem 920.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

Various embodiments of any of one or more inventions whose teachings may be presented within this disclosure can be generated in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for generating in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for detecting a hand of a subject in an image, the method being executed by a processor configured to execute machine-readable instructions, the method comprising:
   receiving image data for an image, the image capturing one or more hands of one or more subjects;
   processing the image data using a first location network to obtain segments in the image, each of the segments containing the portion of the hand of the subject;
   combining the segments into a first image area;
   expanding the size of the first image area by a predetermined margin; and
   processing the first image area using a grid-based detection network to obtain a second image area, the second image area capturing a hand of the subject, wherein expanding the size of the first image area by the predetermined margin comprises:
      dividing the image into n by n grids, wherein the predetermined margin is the size of an individual grid cell;
      expanding the first image area by the predetermined margin; and
      aligning the border of the first image area to the grids.

2. The method of claim 1, wherein the first location network includes a convolution neural network (CNN) having two sub stages connected in a series.

3. The method of claim 1, wherein the segments include a first segment and a second segment, the first segment containing a first portion of the hand of the subject, and the second segment containing a second portion of the at least one hand of the subject, wherein the first portion overlaps with the second portion at least in part.

4. The method of claim 1, wherein the grid-based detection network comprises a deep CNN that includes multiple layers configured to process the grid cells of the first image area.

5. The method of claim 4, wherein the grid-based detection network includes more than three layers.

6. The method of claim 1, further comprising training the first location network with training image data having markings of positions and sizes of hands of subject using a Batch Gradient Descent method.

7. The method of claim 6, further comprising processing the training image data using the first location network to obtain image segments containing portions of the hands of the subjects, combining and expanding the image segments to obtain image areas capturing the hands of the subjects, and training the grid-based detection network with image areas.

8. A system for detecting a hand of a subject in an image, the system comprising a processor configured to execute machine-readable instructions such that when the machine-readable instructions are executed, the system is caused to perform operations including:

receiving image data for an image, the image capturing one or more hands of one or more subjects;

processing the image data using a first location network to obtain segments in the image, each of the segments containing the portion of the hand of the subject;

combining the segments into a first image area;

expanding the size of the first image area by a predetermined margin; and processing the first image area using a grid-based detection network to obtain a second image area, the second image area capturing a hand of the subject, wherein expanding the size of the first image area by the predetermined margin comprises:

dividing the image into n by n grids, wherein the predetermined margin is the size of an individual grid cell;

expanding the first image area by the predetermined margin; and aligning the border of the first image area to the grids.

9. The system of claim 8, wherein the first location network includes a convolution neural network (CNN) having two sub stages connected in a series.

10. The system of claim 8, wherein the segments include a first segment and a second segment, the first segment containing a first portion of the hand of the subject, and the second segment containing a second portion of the at least one hand of the subject, wherein the first portion overlaps with the second portion at least in part.

11. The system of claim 8, wherein the grid-based detection network comprises a deep CNN that includes multiple layers configured to process the grid cells of the first image area.

12. The system of claim 11, wherein the grid-based detection network includes more than three layers.

13. The system of claim 11, wherein the processor is further caused to perform processing the training image data using the first location network to obtain image segments containing portions of the hands of the subjects, combining and expanding the image segments to obtain image areas capturing the hands of the subjects, and training the grid-based detection network with image areas.

14. The system of claim 8, wherein the processor is further caused to perform training image data having markings of positions and sizes of hands of subject using a Batch Gradient Descent method.

15. A non-transitory computer readable storage medium storing a plurality of machine-readable instructions that, when executed by a processor of a computer system for detecting a hand of a subject in an image, cause the computer system to perform operations including:

receiving image data for an image, the image capturing one or more hands of one or more subjects;

processing the image data using a first location network to obtain segments in the image, each of the segments containing the portion of the hand of the subject;

combining the segments into a first image area;

expanding the size of the first image area by a predetermined margin; and processing the first image area using a grid-based detection network to obtain a second image area, the second image area capturing a hand of the subject, wherein expanding the size of the first image area by the predetermined margin comprises:

dividing the image into n by n grids, wherein the predetermined margin is the size of an individual grid cell;

expanding the first image area by the predetermined margin; and aligning the border of the first image area to the grids.

16. The non-transitory computer readable storage medium of claim 15, wherein the segments include a first segment and a second segment, the first segment containing a first portion of the hand of the subject, and the second segment containing a second portion of the at least one hand of the subject, wherein the first portion overlaps with the second portion at least in part.

17. The non-transitory computer readable storage medium of claim 15, wherein the grid-based detection network comprises a deep convolution neural network (CNN) that includes multiple layers configured to process the grid cells of the first image area.

18. The non-transitory computer readable storage medium of claim 15, further comprising instructions that when executed cause the computer system to train the first location network with training image data having markings of positions and sizes of hands of subject using a Batch Gradient Descent method.

19. The non-transitory computer readable storage medium of claim 18, further comprising instructions that when executed cause the computer system to process the training image data using the first location network to obtain image segments containing portions of the hands of the subjects, combine and expand the image segments to obtain image areas capturing the hands of the subjects, and training the grid-based detection network with image areas.

* * * * *